July 7, 1925.  
E. BURHORN  
1,545,123  
COOLING TOWER  
Filed Feb. 1, 1922
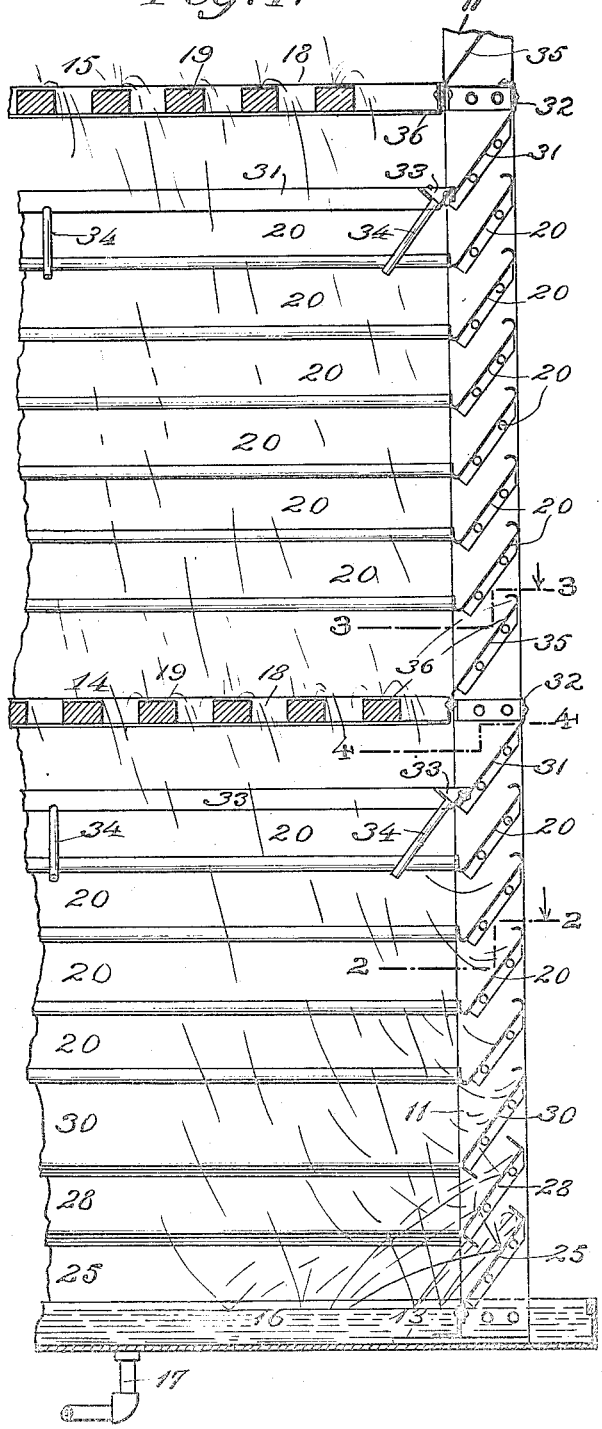
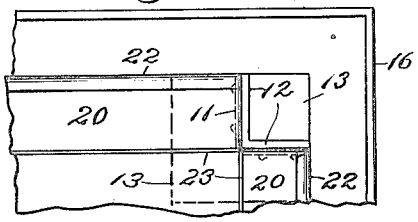
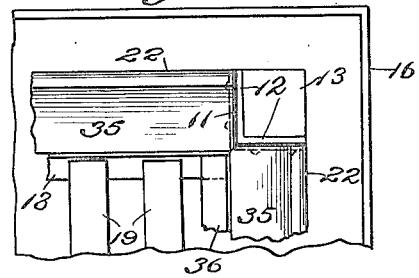
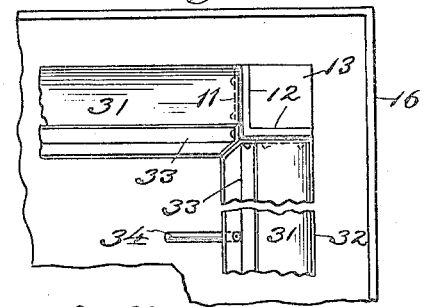
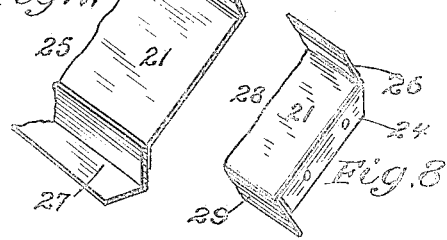
INVENTOR  
Edwin Burhorn,  
BY Rogers, Kennedy & Campbell,  
ATT'YS.

Patented July 7, 1925.

1,545,123

UNITED STATES PATENT OFFICE.

EDWIN BURHORN, OF HOBOKEN, NEW JERSEY.

COOLING TOWER.

Application filed February 1, 1922. Serial No. 533,283.

*To all whom it may concern:*

Be it known that I, EDWIN BURHORN, a citizen of the United States, residing at Hoboken, in the county of Hudson and State of New Jersey, have invented certain new and useful Improvements in Cooling Towers, of which the following is a specification, reference being had therein to the accompanying drawing.

This invention is a novel cooling tower, that is to say, an apparatus of the class by which natural air currents are brought into contact with the water to be cooled, the latter being caused to pass by gravity through the tower while subjected to the cooling influence. More especially the invention relates to the class of cooling towers in which the descent of the warm water is interrupted and delayed by means of one or more structures or cooling decks arranged at various points in the height of the tower for the purpose of preventing a too rapid passage of the water and failure to sufficiently cool the same.

The general object of the present invention is to improve the construction and operation of cooling towers of the kind referred to. A particular object is to afford a superior system of louvers for such a tower adapted to minimize the loss of water from the tower. A substantial loss of water has occurred with prior cooling towers for several reasons. A strong atmospheric current causes the descending water to trend toward the lee side. The water concentrates at the lee side striking the deck members and the louvers with force and also splashing from the collecting pan at the base. In certain prior patents are disclosed schemes for reducing the loss of water but with a very strong wind there will still be a substantial amount of water lost, with attendant waste and expense. Moreover a very strong wind tends to blow surface water lying on the louvers and cause it to climb up and blow off the edges of the louvers. The present invention obviates these several difficulties and affords the maximum of water loss prevention. Other objects and advantages of the invention herein disclosed will appear in the following description or will be apparent to those skilled in the art.

To the attainment of the above referred to objects and advantages, the present invention consists in the novel combinations, arrangements, constructions, devices and other features shown or described herein.

In the accompanying drawings, Figure 1 is a side elevation of a cooling tower embodying my invention, the same partly in section.

Figure 2 is a plan view taken partly in section on the line 2—2 of Figure 1.

Figure 3 is a similar plan view partly in section on the line 3—3 of Figure 1.

Figure 4 is a similar view on the line 4—4 of Figure 1.

Figures 5, 6, 7 and 8 are perspective views of the louvers 20, 25, 28 and 30 respectively.

The tower is shown as having a number of uprights or corner posts 11, the lower ends of which are secured to flanges 12 of base plates 13. The tower may be square, involving four uprights 11. There may be a plurality of spaced apart decks. A deck 14 is shown somewhat above the base and above that a deck 15, and there may be further ones carried to any desired height. At the base is shown a collecting pan 16 within which are secured the base plates 13, so that the feet of the corner posts are all immersed in the collecting pan. A drain pipe or outlet 17 from the collecting pan conducts the water to a condenser or other apparatus in which it is to be used, and there will be understood to be a water distributing means at the top of the tower, by which the warm water is supplied to the tower, to pass downwardly from deck to deck in the process of being cooled for repeated use in the condenser.

Each of the decks, 14, 15, etc., are shown supported at the proper level by angle irons 18 extending across the tower and supported at the corner posts. The particular construction of the decks is immaterial but they are herein shown as comprising spaced apart bars or slats 19. The bars of one deck are arranged to discharge upon the bars of the deck beneath by reason of each bar in one deck being above the space between two bars of the deck beneath.

I have shown the sides of the tower enclosed by tiers of inclined louvers, each louver consisting of a thin, preferably metallic plate, set at an incline, so that the water thereon is drained toward the interior, the louvers being spaced apart to permit the easy passage of natural air currents through the tower.

The louver system of the present invention comprises a number of tiers of what may be termed regular louvers, and other tiers of special louvers. The regular louvers 20, shown separately in Figure 5, comprise the body portion 21 with an upper bend or curled metal portion 22 constituting a flange or gutter and a similar portion 23 of metal along the lower edge of the louver. At each end the louver may be formed with an attaching flange 24 by which it is secured to the corner post. A tower composed of sides formed wholly of such regular louvers reduces the water loss but does not completely prevent the loss of water, as a good deal may escape in the manner hereinbefore stated. More especially water is liable to escape near the bottom of the tower, by reason of the splashing, and near each deck for similar reasons. I have therefore provided a number of specially constructed louvers, which are novel in themselves and cooperate in a novel manner.

Thus at the bottom I have shown a special louver 25, having a body portion 21 similar to the regular louver, but with a right angled or square upper flange 26, longer than the curved upper flange of the regular louver. The inner or lower edge of the louver 25 is formed with an angle plate 27 which may be one of the frame members rigidly connected to the corner posts.

Next above the louver 25 is shown another special louver 28 having an extended upper flange 26 similar to that of louver 25. The louver 28 also has a downward flange 29 at its inner lower edge. It will be noticed that the special louvers 25 and 28 cooperate in that the inner downward flange of the latter and the upward outer flange of the former effectually obstruct the diagonal passage between the louvers against exit of water by splashing or otherwise, while freely permitting the passage of air.

Next above the special louver 28 is a special louver 30, which is a form intermediate between the louver 28 and the regular louver 20 above. It has its inner flange like the louver below it and an outer flange like the louver above it.

It will be understood that the form of louver 28 could be duplicated, affording several tiers, but this is not necessary if the limit of height of splashing is insufficient to carry the water out between the louvers 30 and 20 as shown.

The special louvers 31 and 35 about to be described are arranged one above the other at suitable intervals at the height of the tower, preferably adjacent each deck. Thus just below the level of the deck 14 is shown the special louver 31 having an upper attaching flange 32 and at the inner margin a gutter 33 adapted to receive the water from the louver and water dripping thereto from above. From this gutter are one or more inwardly extending drain pipes 34 acting to carry the water back into the interior of the tower.

Just above each deck level is a special louver 35, at its outer edge like the regular louvers, and at its lower edge formed or connected with an angle iron 36, which may correspond with the angle irons 18 that support the deck bars.

It will thus be seen that I have described a cooling tower consisting of frame, decks, and louvers, constructed and arranged to embody the principles and attain the advantages of the present improvement. The cooling tower is simple, inexpensive, rigid and durable. The very maximum saving of water is secured with the minimum impeding of air flow. Many matters of construction, combination and arrangement may be variously modified without departing from the principles hereof, and therefore it is not intended to limit the invention except in so far as set forth in the appended claims.

What is claimed is:

1. In a cooling tower an upstanding frame through which the water descends, a collecting vessel at the base, a series of spaced apart decks arranged to intercept and delay the water's descent, and a series of inclined louvers arranged at the tower sides in a manner to permit natural air currents to pass through the interior of the tower, including louvers, as 20, each having both its outer and inner margins turned up and back upon itself, and other louvers between said louvers and the vessel with upwardly and downwardly extended flanges such as effectually to block the inclined air passages against outward splashing and loss of water.

2. In a cooling tower an upstanding frame through which the water descends, a collecting vessel at the base, a series of spaced apart decks arranged to intercept and delay the water's descent, and a series of inclined louvers arranged at the tower sides in a manner to permit natural air currents to pass through the interior of the tower, the lowest tier of louvers arranged to deliver directly into the vessel at its inner edge, and the louvers next above provided, at their inner edges with down flanges and at their outer edges with up flanges, both extending a substantial distance into the inclined air passage between the louvers, whereby splashing out of water is prevented.

3. In a cooling tower an upstanding frame through which the water descends, a collecting vessel at the base, a series of spaced apart decks arranged to intercept and delay the water's descent, and a vertical series of inclined louvers arranged at the tower sides in a manner to permit natural air currents to pass through the interior of the tower, said series having, at intervals in the series, special louvers, as 31, provided with inner edge gutters and means to drain such gutters into the tower interior, and special louvers immediately above such drain-gutter louvers arranged to discharge into such gutters.

In testimony whereof, I have affixed my signature hereto.

EDWIN BURHORN.